(12) United States Patent
Yabushita et al.

(10) Patent No.: US 11,673,608 B2
(45) Date of Patent: Jun. 13, 2023

(54) VEHICLE, UPPER UNIT AND NON-TRANSITORY STORAGE MEDIUM

(71) Applicant: TOYOTA JIDOSHA KABUSHIKI KAISHA, Toyota (JP)

(72) Inventors: Hiroki Yabushita, Toyota (JP); Keiichi Kondo, Chiryu (JP); Kaori Takahashi, Nagoya (JP); Jin Xin, Nagoya (JP); Daisuke Mizushima, Toyota (JP); Satoru Ando, Nagoya (JP); Takeshi Murakami, Okazaki (JP); Yuchi Yamanouchi, Toyota (JP); Kenta Miyahara, Toyota (JP); So Sawahira, Toyota (JP); Rina Mukai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 260 days.

(21) Appl. No.: 17/090,354

(22) Filed: Nov. 5, 2020

(65) Prior Publication Data
US 2021/0129909 A1    May 6, 2021

(30) Foreign Application Priority Data
Nov. 6, 2019    (JP) .............................. JP2019-201810

(51) Int. Cl.
*B62D 21/14*    (2006.01)
*B62D 39/00*    (2006.01)
*B62D 33/08*    (2006.01)

(52) U.S. Cl.
CPC ............. *B62D 21/14* (2013.01); *B62D 33/08* (2013.01); *B62D 39/00* (2013.01)

(58) Field of Classification Search
CPC ...... B62D 21/14; B62D 33/08; B62D 47/003; B62D 63/025; B62D 25/20
See application file for complete search history.

(56) References Cited

U.S. PATENT DOCUMENTS

| 3,765,716 | A | * | 10/1973 | Van Gompel | B60J 7/1614 |
| | | | | | 296/100.08 |
| 3,815,949 | A | * | 6/1974 | Ulert | B62D 33/08 |
| | | | | | 52/67 |
| 4,339,148 | A | * | 7/1982 | Smith | B62D 27/06 |
| | | | | | 296/35.3 |
| 6,059,058 | A | * | 5/2000 | Dower | B60L 50/52 |
| | | | | | 180/65.265 |
| 2014/0008897 | A1 | * | 1/2014 | Tsukerman | B62D 21/14 |
| | | | | | 280/657 |
| 2017/0197679 | A1 | * | 7/2017 | Scaringe | B60K 1/02 |
| 2018/0050626 | A1 | * | 2/2018 | Delp | B60L 50/60 |

(Continued)

FOREIGN PATENT DOCUMENTS

| CN | 103562052 | A | | 2/2014 | |
| GB | 2463897 | A | * | 3/2010 | ............ B62D 21/14 |
| JP | 1-125273 | U | | 8/1989 | |

(Continued)

*Primary Examiner* — Frank B Vanaman
(74) *Attorney, Agent, or Firm* — Sughrue Mion, PLLC

(57) ABSTRACT

A vehicle comprises an under unit which is equipped with a driving mechanism configured to rotate wheels of the vehicle, and an upper unit which is mounted on the under unit. The upper unit comprises an extension/contraction mechanism which is configured to extend or contract the upper unit according to a size of the under unit.

13 Claims, 9 Drawing Sheets

(56) References Cited

U.S. PATENT DOCUMENTS

2019/0197927 A1    6/2019   Matsuoka et al.
2020/0239078 A1*   7/2020   Hung ..................... B60L 50/66

FOREIGN PATENT DOCUMENTS

| JP | 2014-508683 | A  | 4/2014 |
| JP | 6477856     | B1 | 3/2019 |
| WO | 97/14601    | A1 | 4/1997 |

* cited by examiner

[Fig. 1]
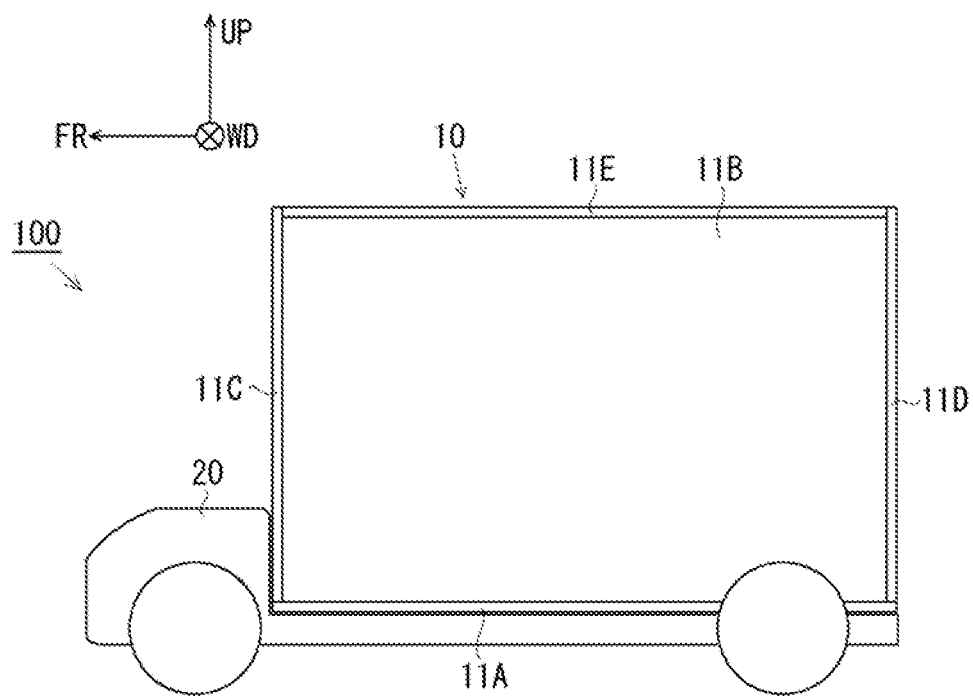
[Fig. 2]
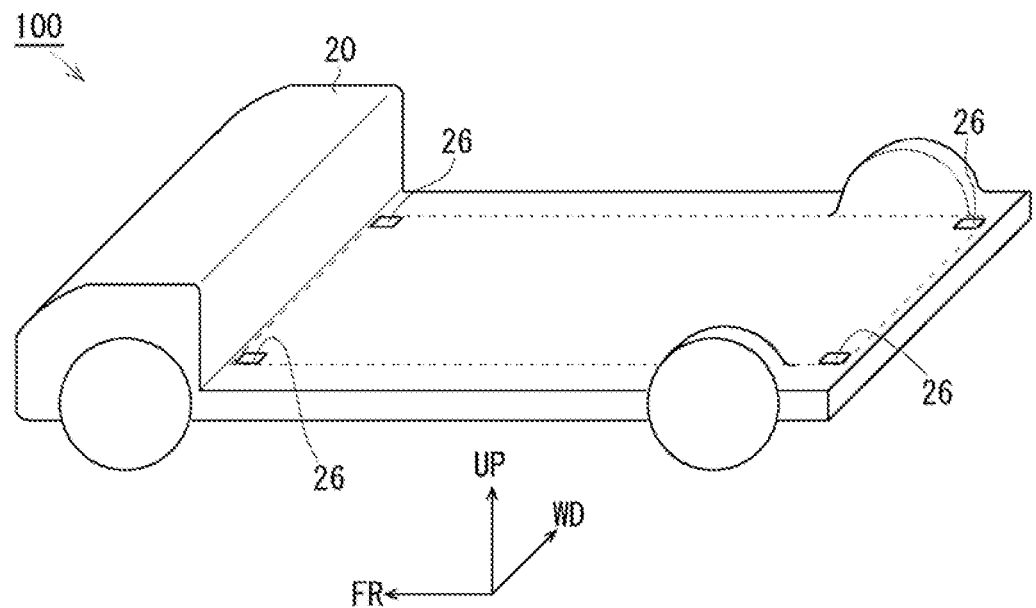

[Fig. 3]
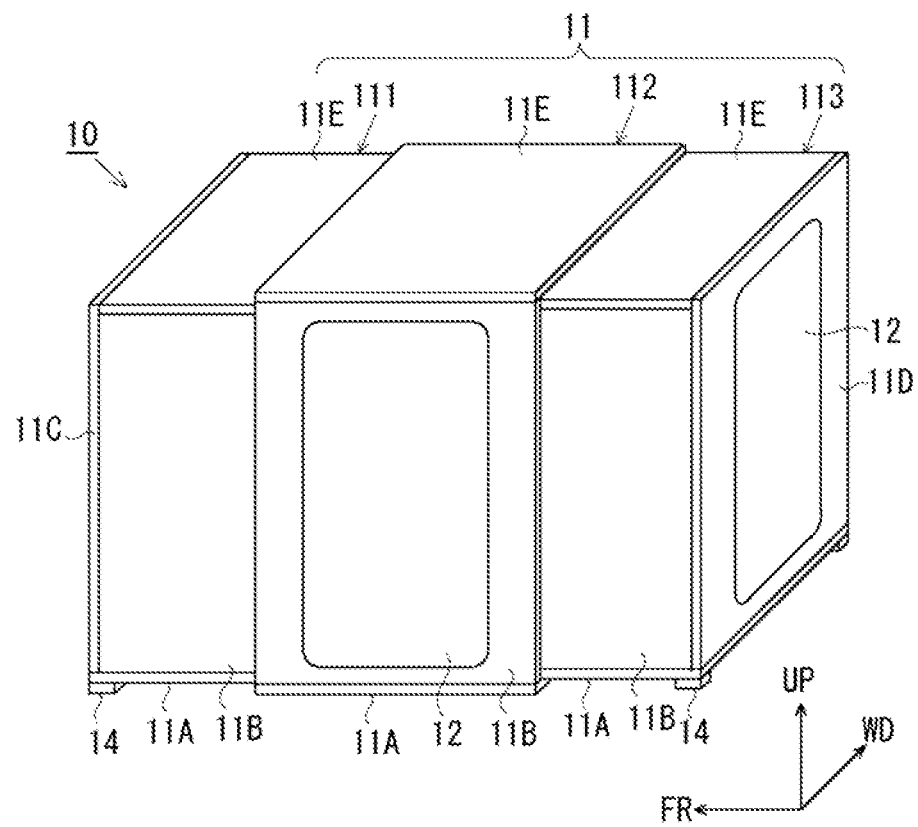

[Fig. 4]
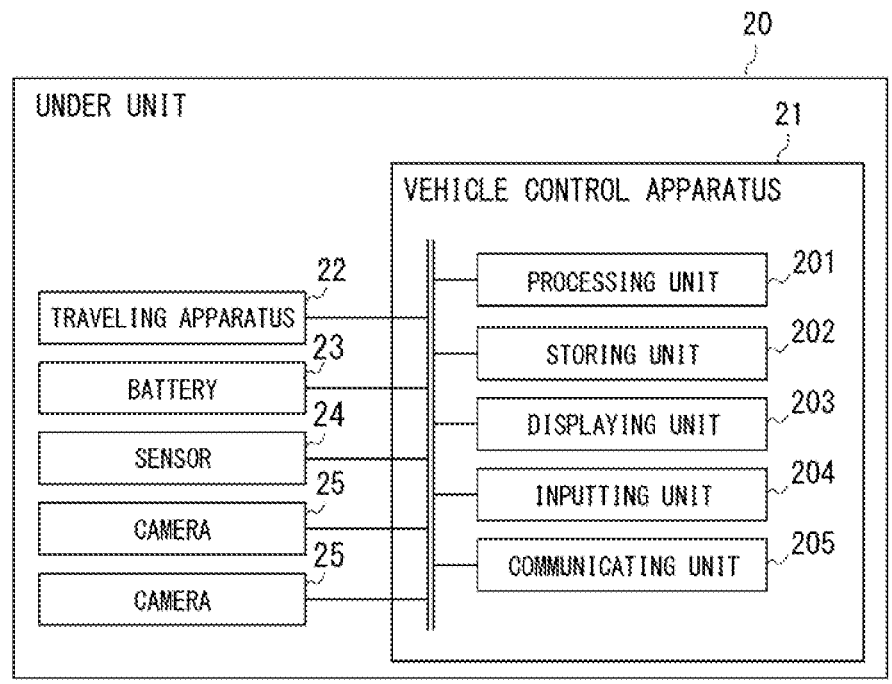
[Fig. 5]
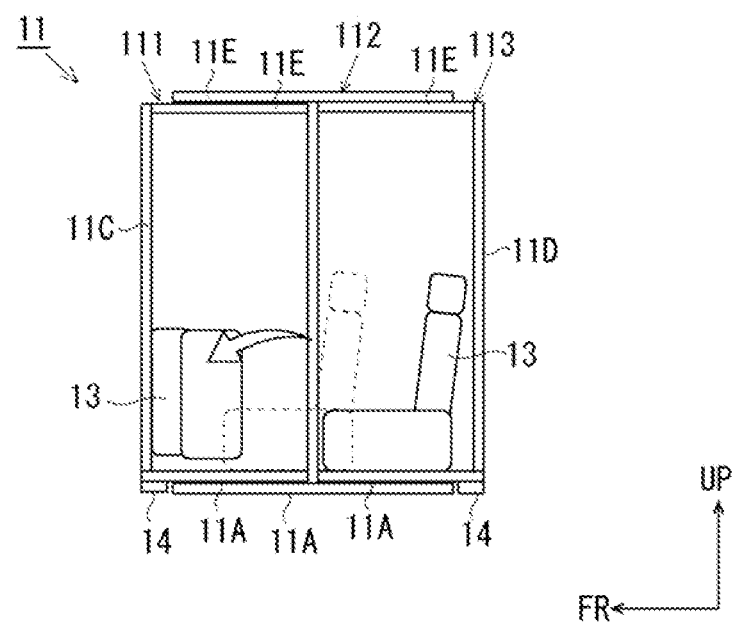

[Fig. 6]
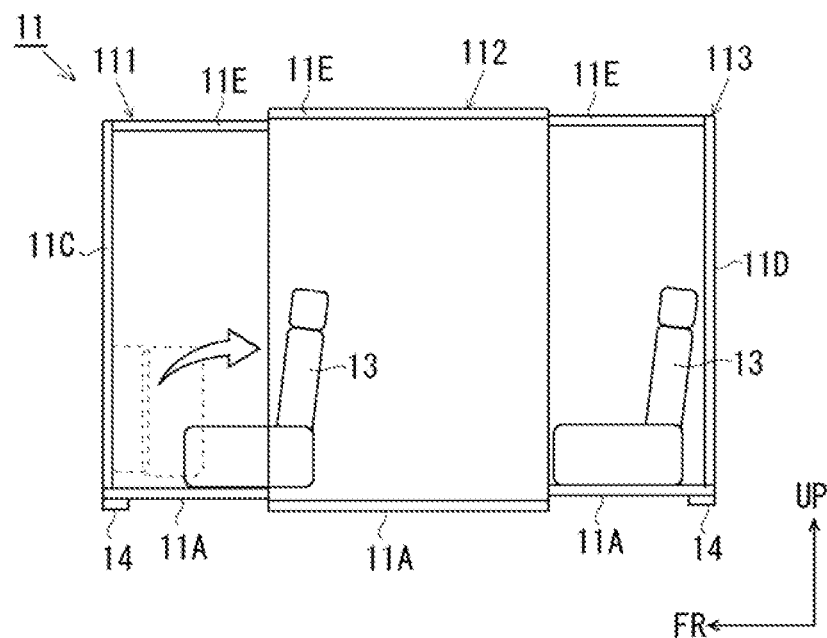
[Fig. 7A]
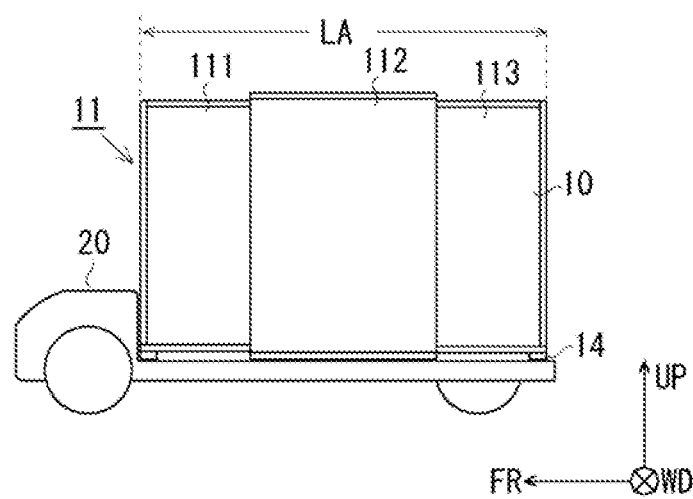

[Fig. 7B]
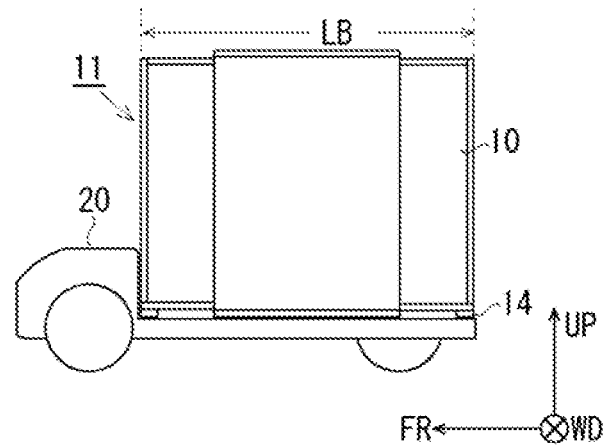
[Fig. 7C]
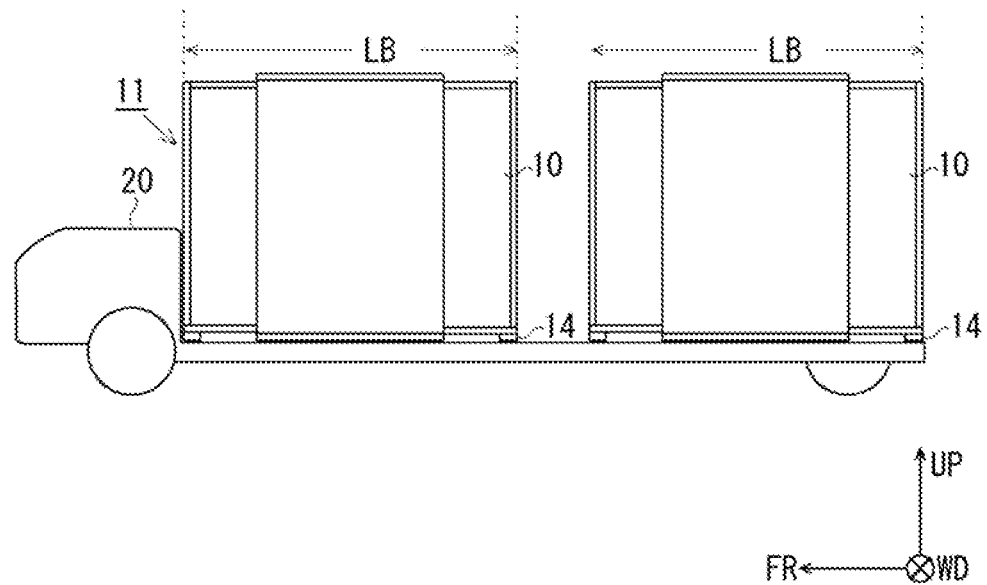

[Fig. 7D]
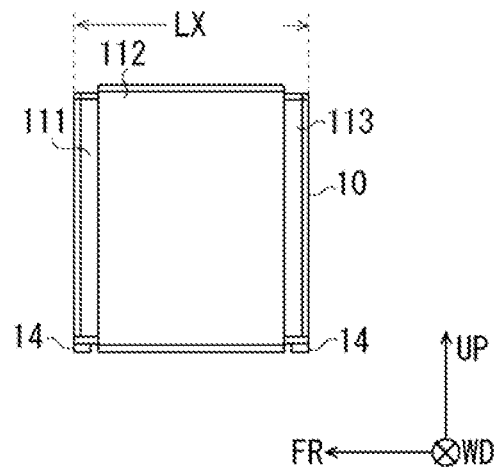
[Fig. 8]
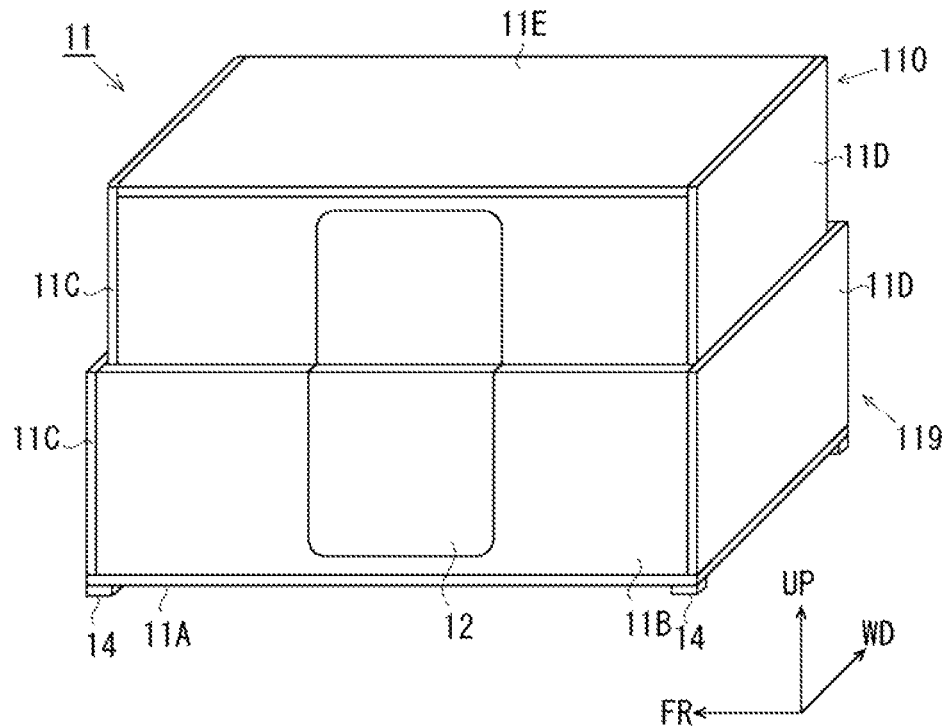

[Fig. 9]
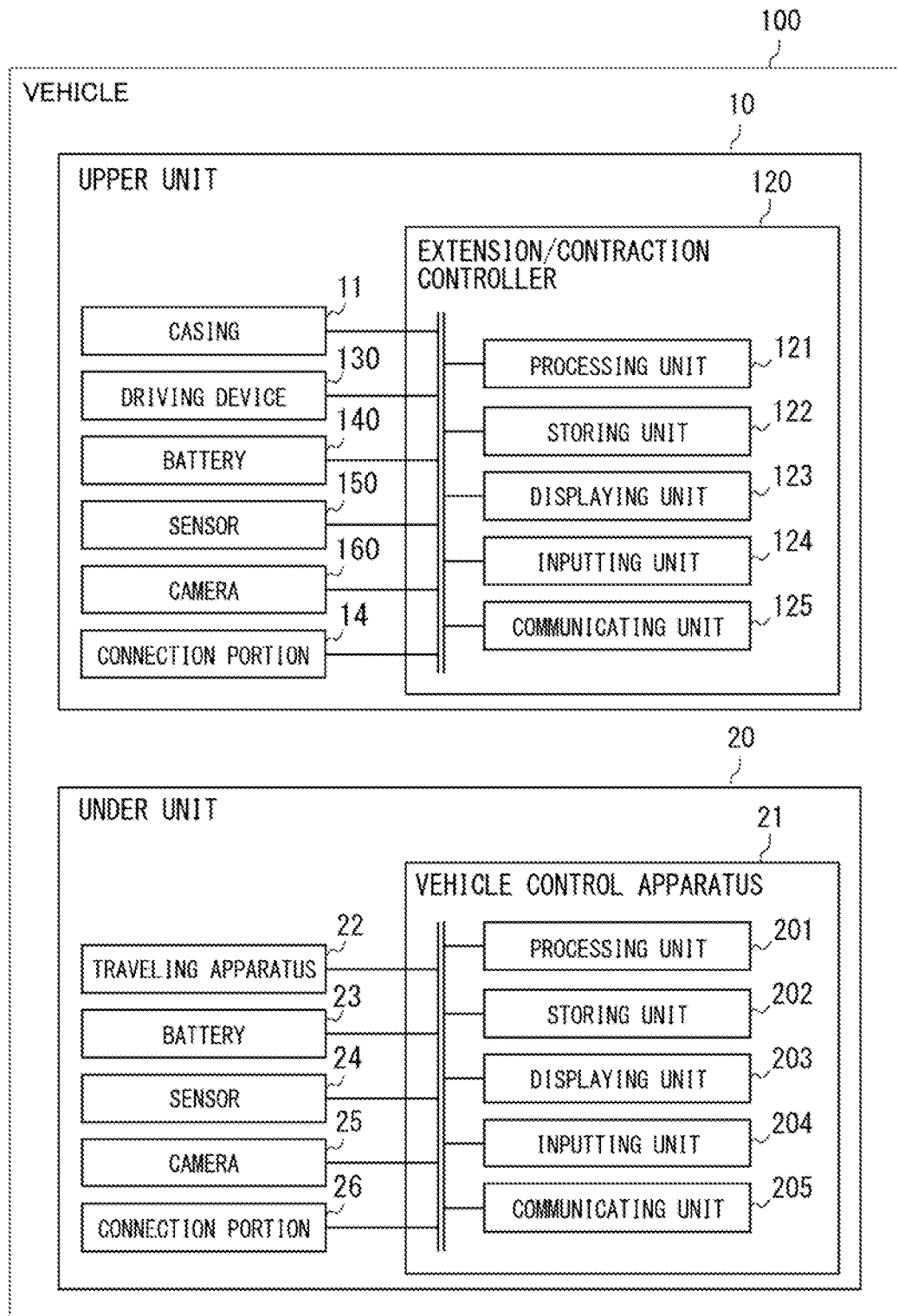

[Fig. 10]
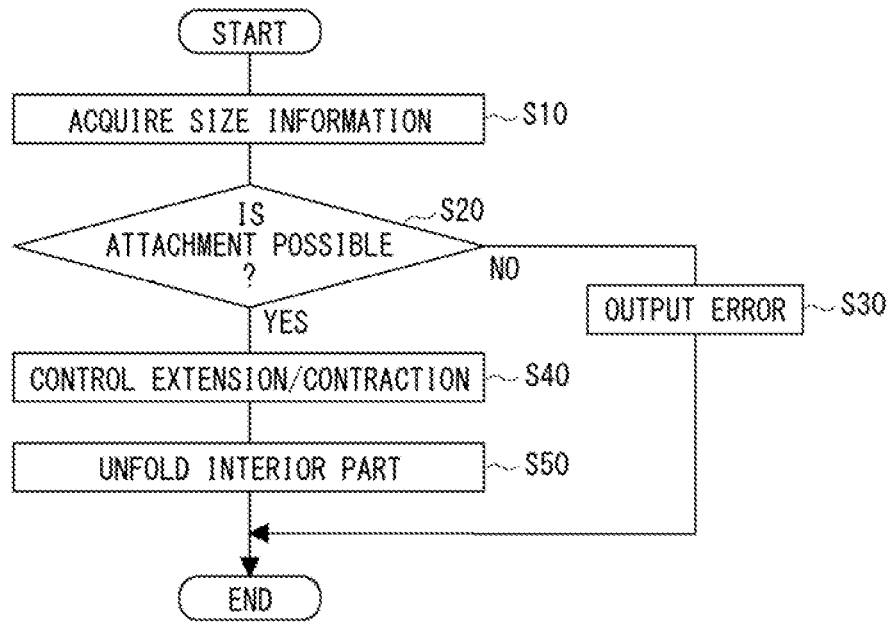
[Fig. 11]
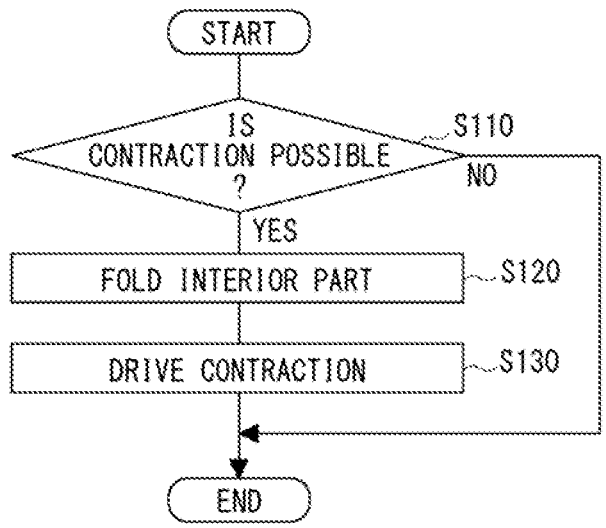

[Fig. 12]
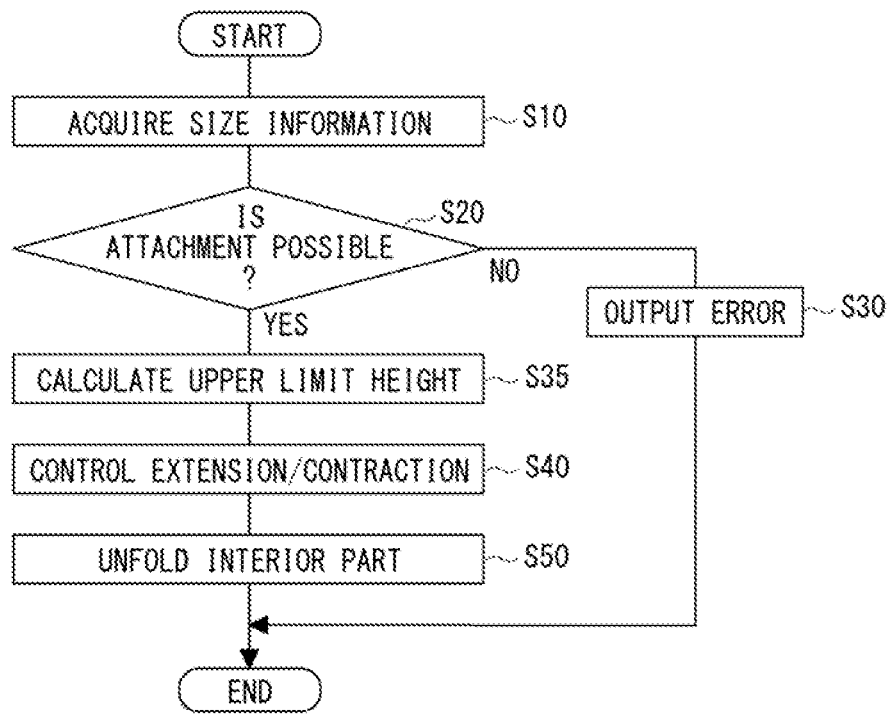

US 11,673,608 B2

VEHICLE, UPPER UNIT AND NON-TRANSITORY STORAGE MEDIUM

CROSS-REFERENCE TO RELATED APPLICATIONS

This application claims the benefit of Japanese Patent Application No. 2019-201810, filed on Nov. 6, 2019, which is hereby incorporated by reference herein in its entirety.

BACKGROUND

Technical Field

The present disclosure relates to a vehicle, an upper unit and a non-transitory storage medium.

Description of the Related Art

Patent document 1 discloses a car formed by mechanically and electrically coupling a front end unit arranged on a front end, a rear end unit arranged on a rear end, and one or more intermediate units arranged between the front end unit and the rear end unit.

CITATION LIST

Patent Document

Patent document 1: Japanese Patent No. 6477856

SUMMARY

An object of the present disclosure is to provide a technique that enables extension and contraction of an upper unit according to situations such as attachment of the upper unit to an under unit, exchange of the under unit on which the upper unit is mounted and storage of the upper unit.

The present disclosure can be grasped as a vehicle. In this case, the vehicle may comprise:

an under unit comprising a driving mechanism configured to cause wheels to rotate; and an upper unit being mounted on the under unit and comprising an extension/contraction mechanism configured to extend or contract according to a size of the under unit.

The present disclosure can be grasped as an upper unit which is equipped with a driving mechanism configured to rotate wheels of a vehicle. In this case, the upper unit may be, for example, mounted on an under unit of a vehicle. And, the upper unit may comprise an extension/contraction mechanism configured to extend or contract according to a size of the under unit.

The present disclosure can be grasped as a program or a non-transitory storage medium that stores the program. In this case, the program may be configured to cause a processor to execute steps of:

acquiring a size of an under unit equipped with a driving mechanism configured to rotate wheels of a vehicle; and controlling an extension/contraction mechanism based on the size of the under unit, the extension/contraction mechanism being configured to cause an upper unit that is to be mounted on the under unit to extend or contract.

According to the present disclosure, it is possible to provide a technique that enables extension and contraction of an upper unit according to situations such as attachment of the upper unit to an under unit, exchange of the under unit on which the upper unit is mounted and storage of the upper unit.

BRIEF DESCRIPTION OF THE DRAWINGS

FIG. 1 is a side view of a vehicle according to a first embodiment;

FIG. 2 is a perspective view of an under unit;

FIG. 3 is a perspective view of an upper unit;

FIG. 4 is a diagram illustrating a configuration of the under unit;

FIG. 5 is a schematic sectional view illustrating a state in which a casing is contracted;

FIG. 6 is a schematic sectional view illustrating a state in which the casing is extended;

FIG. 7A is a diagram illustrating a state in which the extended upper unit is attached to the under unit;

FIG. 7B is a diagram illustrating a state in which the contracted upper unit is attached to the under unit;

FIG. 7C is a diagram illustrating a state in which the plurality of contracted upper units are attached to the under unit;

FIG. 7D is a diagram illustrating a state in which the length of the upper unit is shortened to the minimum length;

FIG. 8 is a diagram illustrating an example of the upper unit the height of which can be extended or contracted;

FIG. 9 is a diagram illustrating a configuration of a vehicle according to a second embodiment;

FIG. 10 is a flowchart illustrating a process that an extension/contraction controller executes at the time of attaching the upper unit;

FIG. 11 is a flowchart illustrating a process that the extension/contraction controller executes at the time of storing the upper unit; and FIG. 12 is a flowchart illustrating a modification of the process that the extension/contraction controller executes at the time of attaching the upper unit.

DESCRIPTION OF THE EMBODIMENTS

First Embodiment

A configuration of a vehicle 100 will be described below with reference to drawings. FIG. 1 is a side view of the vehicle 100 according to the present embodiment. FIG. 2 is a perspective view of an under unit 20. FIG. 3 is a perspective view of an upper unit 10. Note that an arrow FR, an arrow UP and an arrow WD illustrated in the drawings indicate a forward direction in a vehicle longitudinal direction, an upward direction in a vehicle vertical direction and a vehicle width direction, respectively.

<Overall Configuration>

The vehicle 100 disclosed in the present embodiment is provided with the under unit 20 provided with a driving mechanism that causes wheels to rotate, and the upper unit 10 mounted on the under unit 20. The vehicle 100 is such a vertically separated type vehicle that the under unit 20 and the upper unit 10 can be separated. According to such a configuration, a combination of the under unit 20 and the upper unit 10 of the vehicle 100 can be changed. As the upper unit 10, a plurality of kinds of upper units with different purposes, such as an upper unit for passengers which is provided with a seat comfortable to sit on and in which a large space around the seat is secured, an upper unit for freight in which a large freight compartment is secured, and an upper unit for camping provided with cooking equipment, beds or the like, are conceivable. For example, by combining the upper unit 10 for passengers and the under unit 20, the vehicle 100 can be used as a passenger car. Further, by combining the upper unit 10 for camping and the under unit 20, the vehicle 100 can also be used as a camping car.

In the vehicle 100 of the present embodiment, the upper unit 10 is provided with an extension/contraction mechanism. Thereby, the upper unit 10 can extend or contract according to a size of the under unit 20. Therefore, one upper unit 10 can be attached to under units 20 with different sizes and used. As a result, a degree of freedom of combination of the under unit 20 and the upper unit 10 is improved.

<Configuration of Each Portion>

FIG. 4 is a diagram illustrating a configuration of the under unit 20. The under unit 20 has a vehicle control apparatus 21, a traveling apparatus 22, a battery 23, a sensor 24 and a camera 25.

The traveling apparatus 22 is a mechanism that causes the under unit 20 to travel and has a power source such as an internal-combustion engine or a motor, a power generator, a braking mechanism, a steering mechanism and the like.

The battery 23 supplies power to each of the portions (for example, the vehicle control apparatus 21 and the like) of the under unit 20. The battery 23 stores power generated by the power generator of the traveling apparatus 22. Note that the battery 23 may be configured to store power when being connected to an external commercial power supply. Further, as the battery 23, a fuel cell that generates power using fuel such as hydrogen, and the like may be included.

The sensor 24 includes a vehicle speed sensor, an acceleration sensor, a direction sensor, a rainfall sensor, a temperature sensor, an obstacle sensor and the like and detects a state of the under unit 20 or a state around the under unit 20. The obstacle sensor is configured including a camera, a radar, a LiDAR (Laser Imaging Detection and Ranging) or the like.

The camera 25 is an apparatus that photographs surroundings of the under unit 20. The camera 25 may include a plurality of cameras for photographing, for example, the forward, rearward, left and right directions of the under unit 20, respectively. Further, an image photographed by the camera 25 may be video or a still image. The camera 25 may be used as a sensor for acquiring information showing a state around the under unit 20.

The vehicle control apparatus 21 is a computer mounted on the under unit 20 and is provided with a processing unit 201, a storing unit 202, a displaying unit 203, an inputting unit 204 and a communicating unit 205.

The processing unit 201 realizes various kinds of functions that the vehicle control apparatus 21 has, by controlling the overall operation of the vehicle control apparatus 21. The processing unit 201 is provided, for example, with a CPU, a ROM, a RAM and the like. The CPU integrally controls operation of the vehicle control apparatus 21. The ROM is a storage medium that stores various kinds of programs and data. The RAM is a storage medium that temporarily stores various kinds of programs and data. The RAM may function as a main memory by being configured such that the CPU can directly access the RAM. The CPU executes a program stored in the ROM, the storing unit 202 or the like with the RAM as a work area. Thereby, the processing unit 201 processes information acquired via the sensor 24 or the inputting unit 204 and executes control to cause the under unit 20 to autonomously travel toward a destination. For example, when receiving information about a destination from a user's smartphone, the processing unit 201 calculates a route from a present location to the destination and performs autonomous driving according to the route.

The storing unit 202 is a storage device such as an HDD or an SDD. The storing unit 202 functions as an external storage device of the processing unit 201. The storing unit 202 stores map information, correspondence information, resource information or the like. The displaying unit 203 is a device for displaying information and is configured, for example, including a liquid crystal display device, an organic electroluminescent display device or the like. The displaying unit 203 may be configured to perform display to a driver or passengers or may be configured to perform display to people outside the vehicle 100.

The inputting unit 204 is a means for accepting operation of the user and is configured, for example, including buttons, a touch panel or the like. The communicating unit 205 is a communication interface for performing communication with external apparatuses. For example, in addition to a communication interface to perform communication via a communication network N, the communicating unit 205 may be provided with a plurality of communication interfaces such as a communication interface to directly perform communication with other vehicles. As the communication interface to directly perform communication with other vehicles, Bluetooth®, ZigBee® or a communication interface to perform communication using a Wi-Fi Adhoc mode or the like is given. Further, the communication interface of the communicating unit 205 may be a communication interface to perform communication using commercial radio (simple radio).

Next, the upper unit 10 of the vehicle 100 will be described. The upper unit 10 is provided with a casing 11, a door 12, interior parts 13 and connection portions 14.

As illustrated in FIG. 3, the casing 11 is provided with a floor panel 11A, side panels 11B, a front panel 11C, a rear panel 11D and a roof panel 11E. The casing 11 forms an outer shell of the upper unit 10. Each of the floor panel 11A, the side panels 11B and the roof panel 11E is configured with three divided members in the longitudinal direction.

Front-side members of the floor panel 11A, the side panels 11B and the roof panel 11E, and the front panel 11C form a front end portion 111 of the casing 11. Middle members of the floor panel 11A, the side panels 11B and the roof panel 11E form a middle portion 112 of the casing 11. Rear-side members of the floor panel 11A, the side panels 11B and the roof panel 11E, and the rear panel 11D form a rear end portion 113 of the casing 11.

The front end portion 111 and the rear end portion 113 are formed, with their external shapes (widths and heights) being smaller in comparison with the middle portion 112, and can be inserted into and pulled out from the middle portion 112. Due to such a configuration, the length of the casing 11 in the longitudinal direction of the vehicle 100 can be extended and contracted. FIG. 5 is a schematic sectional view illustrating a state in which the casing 11 is contracted. FIG. 6 is a schematic sectional view illustrating a state in which the casing 11 is extended. As illustrated in FIG. 5, when the front end portion 111 and the rear end portion 113 are inserted into the middle portion 112, the front end portion 111, the middle portion 112 and the rear end portion 113 are in a nested state, and the casing 11 is in a state of being contracted in the longitudinal direction.

By pulling out each of the front end portion 111 and the rear end portion 113 from the middle portion 112, the casing 11 can be in a state of being extended in the longitudinal direction as illustrated in FIG. 6 from the state illustrated in FIG. 5. Thus, in the present embodiment, the casing 11 is divided in the longitudinal direction, and portions (the front end portion 111, the middle portion 112 and the rear end portion 113) are in a nested structure (a telescopic structure) so that the casing 11 can be extended and contracted in the longitudinal direction. In other words, the portions of the nested structure (the front end portion 111, the middle portion 112 and the rear end portion 113) correspond to the extension/contraction mechanism in the present disclosure.

Each of the side panels 11B, the front panel 11C and the rear panel 11D is provided with an opening as a doorway, and a door 12 to open and close the opening is provided. Note that the number of doors 12 is not especially limited. For example, a configuration is possible in which the door is provided on any one of the side panels 11B, the front panel 11C and the rear panel 11D. A configuration is also possible in which a plurality of doors are provided on the side panels 11B, the front panel 11C or the rear panel 11D. Furthermore, the door 12 may be provided with a window that can be opened and closed.

Inside the casing 11, that is, in a space surrounded by the floor panel 11A, the side panels 11B, the front panel 11C, the rear panel 11D and the roof panel 11E, the interior parts 13 are provided. In FIGS. 5 and 6, seats are installed on the floor panel 11A of the front end portion 111 and the rear end portion 113 as the interior parts 13. Note that the interior parts 13 are not limited to seats. The interior parts 13 may be, for example, audio equipment, a display, lighting equipment, a table, an air conditioner, air conditioner outlets, speakers, cooking utensils, beds or the like. Note that the interior parts 13 may be such that can be folded smaller when they are not used than when they are used. For example, in the case of seats, each seat may be configured so that, by folding a seat back to be along a seating face and, furthermore, standing the seating face to be almost vertical relative to the floor panel 11a, the seat is moved to an inner wall side of the front panel 11C or the rear panel 11D (FIG. 5). Thereby, even if the internal space becomes small by contracting the upper unit 10, one interior part 13 that is not used is folded so that a large space can be secured around the other interior part 13 that is used. As a result, it is possible to prevent comfort of the driver from being compromised. Further, by folding the interior parts 13 at the time of contracting the upper unit 10, the interior parts 13 can be certainly accommodated in the contracted upper unit 10.

The connection portions 14 are provided on a lower surface of the casing 11. The connection portions 14 can be connected to and separated from connection portions 26 on the under unit 20 side.

Here, the connection portions 14 and the connection portions 26 may be configured such that, by aligning positions of the connection portions 14 with positions of the connection portions 26 at the time of mounting the upper unit 10 on the under unit 20, for example, engaging claws of the connection portions 26 sandwich rods for engagement that are fixed to the connection portions 14. Thereby, the upper unit 10 can be fixed to the under unit 20. When the upper unit 10 is removed from the under unit 20, connection between the connection portions 14 and the connection portions 26 can be released by opening the engaging claws sandwiching the rods for engagement. Thereby, the upper unit 10 can be removed from the under unit 20.

The length of the upper unit 10 of the present embodiment in the longitudinal direction can be adjusted between LA and LX as illustrated by FIG. 7A to 7D. FIG. 7A to 7C illustrate states in which the upper unit 10 is attached to the under unit 20, being extended or contracted. FIG. 7D illustrates a state in which the upper unit 10 is removed from the under unit 20 and stored. As illustrated by FIG. 7A, in the case of attaching the upper unit 10 to the under unit 20 having a relatively large loading space, the upper unit 10 may be attached to the under unit 20 in a state in which the length of the upper unit 10 is extended to LA. As illustrated by FIG. 7B, in the case of attaching the upper unit 10 to the under unit 20 having a relatively small loading space, the upper unit 10 may be attached to the under unit 20 in a state in which the length of the upper unit 10 is contracted to LB. Further, as illustrated by FIG. 7C, a plurality of upper units 10 each of which has a length contracted to LB may be attached to the under unit 20 having a relatively large loading space.

Further, at the time of removing the upper unit 10 from the under unit 20 to store the upper unit 10, it is possible to keep a storage space small by contracting the length of the upper unit 10 to the minimum length LX as illustrated by FIG. 7D.

Modification of First Embodiment

Though the length of the upper unit 10 can be extended and contracted in the embodiment described above, the present disclosure is not limited thereto. A height of the upper unit 10 may be extended and contracted.

FIG. 8 is a diagram illustrating an example of the upper unit 10 the height of which can be extended or contracted. In the upper unit 10 of FIG. 8, each of the side panels 11B, the front panel 11C and the rear panel 11D of the casing 11 is configured with two divided members in a height direction.

Lower-side members of the side panels 11B, the front panel 11C and the rear panel 11D, and the floor panel 11A form a lower end portion 119 of the casing 11. Further, upper-side members of the side panels 11B, the front panel 11C and the rear panel 11D, and the roof panel 11E form an upper end portion 110 of the casing 11.

The upper end portion 110 is formed, with its external shape (a width and a length) being smaller in comparison with the lower end portion 119, and can be inserted into and pulled out from the lower end portion 119. As illustrated in FIG. 8, by inserting the upper end portion 110 into the lower end portion 119, the upper end portion 110 and the lower end portion 119 are in a nested state, and the casing 11 can be in a state of being contracted in the height direction. Note that, in the example illustrated in FIG. 8, the casing 11 is in a state of being extended in the height direction by the upper end portion 110 being pulled out from the lower end portion 119. Thus, in the present modification, by dividing the casing 11 in the height direction and causing portions (the upper end portion 110 and the lower end portion 119) to be in a nested structure (a telescopic structure), the casing 11 can be extended and contracted in the height direction. In this case, the portions of the nested structure (the upper end portion 110 and the lower end portion 119) correspond to the extension/contraction mechanism of the present disclosure.

Further, the casing 11 may be configured to be extendable and contractible in the width direction, with a plurality of members divided in a width direction WD of the vehicle 100 being in a nested structure. Note that these extension/contraction mechanisms in the length direction, the height direction and the width direction may be combined. Further, though the upper unit 10 is provided with the panels 11A to 11E on six faces of the casing 11, which is a rectangular parallelepiped, respectively, a configuration is also possible in which the roof panel 11E is not provided or can be removed, for example, like an open car or a cargo bed of a truck. Further, a configuration is also possible in which the floor panel 11a is omitted, and an upper surface of the under unit 20 is used as a floor surface of the upper unit 10.

Second Embodiment

FIG. 9 is a diagram illustrating a vehicle 100 of a second embodiment. In the vehicle 100 of the present embodiment, the upper unit 10 is provided with a driving device 130 that drives the extension/contraction mechanism of the upper unit 10 and an extension/contraction controller 120 that controls the driving device 130. Note that the under unit 20 may be provided with the driving device 130 and the extension/contraction controller 120. In comparison with the first embodiment described above, the vehicle 100 of the present embodiment is different in a point that the driving device 130 and the extension/contraction controller 120 are provided and is the same in the other components. Therefore, the same elements as the first embodiment will be given the same reference numerals, and repeated description will be omitted.

The driving device 130 is, for example, a motor or an actuator, and causes the casing 11 to extend or contract by driving the extension/contraction mechanism of the casing 11.

The extension/contraction controller 120 causes the casing 11 of the upper unit 10 to be of a length according to the size of the under unit 20 by controlling the driving device 130. Further, the extension/contraction controller 120 can also cause the upper unit 10 to contract when the upper unit 10 is removed from the under unit 20.

The extension/contraction controller 120 is provided with a processing unit 121, a storing unit 122, a displaying unit 123, an inputting unit 124 and a communicating unit 125. The processing unit 121 realizes various kinds of functions that the extension/contraction controller 120 has, by processing information acquired from the storing unit 122 and the inputting unit 124. The processing unit 121 is provided with, for example, a CPU, a ROM, a RAM and the like. The CPU may integrally control the operation of the upper unit 10. The ROM is a storage medium that stores various kinds of programs and data. The RAM is a storage medium that temporarily stores various kinds of programs and data. The RAM may function as a main memory by being configured such that the CPU can directly access the RAM. The CPU executes a program stored in the ROM, the storing unit 122 or the like with the RAM as a work area. Thereby, the processing unit 121 processes information acquired via the sensor 150 or the inputting unit 124 and executes control of the driving device 130. For example, when receiving a command to attach or remove the upper unit 10, from the user's smartphone (a user terminal), the processing unit 121 executes control of the driving device 130.

The storing unit 122 is a storage device such as an HDD or an SDD. The storing unit 122 functions as an external storage device of the extension/contraction controller 120. The displaying unit 123 is a device that displays information such as error indication and is, for example, a liquid crystal display device, an organic electroluminescent display device or the like. The displaying unit 123 may be configured to perform display to the driver or may be configured to perform display to people outside the vehicle 100.

The inputting unit 124 is a device to accept operation of the user and is configured including, for example, buttons, a touch panel or the like. The communicating unit 125 is a communication interface for performing communication with an external apparatus. The communicating unit 125 performs communication via the communication network N.

Note that the communicating unit 125 may further be provided with a communication interface for performing communication directly with other vehicles. As the communication interface to perform communication directly with other vehicles, Bluetooth®, ZigBee®, a communication interface to perform communication using Wi-Fi Adhoc mode, or the like is given. Further, the communication interface of the communicating unit 125 may be a communication interface to perform communication using commercial radio (simple radio).

Note that, since a battery 140, a sensor 150 and a camera 160 illustrated in FIG. 9 are similar to the battery 23, the sensor 24 and the camera 25 of the under unit 20, respectively, description thereof will be omitted.

FIG. 10 is a flowchart illustrating a process that the extension/contraction controller 120 executes at the time of attaching the upper unit 10. When an instruction to attach the upper unit 10 is given from the user terminal or the inputting unit 124 by operation of the user, the process of FIG. 10 is started.

At step S10, the extension/contraction controller 120 acquires size information about the under unit 20 by communicating with the vehicle control apparatus 21 of the under unit 20. Note that a method for acquiring the size information is not limited to the method using communication but may be a method of reading size information of a bar code written on the under unit 20. Further, the extension/contraction controller 120 may acquire the size of the under unit 20 by performing image analysis of image data of the under unit 20 photographed by the camera 160. For example, the extension/contraction controller 120 may extract the connection portions 26 of the under unit 20 by image analysis and calculate the size of the under unit 20 from intervals among the plurality of connection portions 26. Note that the extension/contraction controller 120 may acquire a model of the under unit 20 or attribute information about equipment and the like that the under unit 20 is provided with, in addition to the size information.

At step S20, the extension/contraction controller 120 determines whether the upper unit 10 can be attached to the under unit 20, based on the acquired size information. For example, if the acquired size information indicates being within an adjustment range (an extension/contraction range) of the upper unit 10, the extension/contraction controller 120 determines that the upper unit 10 can be attached to the under unit 20 (a positive determination at step S20). Further, the extension/contraction controller 120 may perform the above determination based on attribute information about the under unit 20 in addition to the size information.

If a negative determination is made at step S20, the extension/contraction controller 120 outputs an error message at step S30 and ends the process of FIG. 10. Note that the output of the error message is, for example, display of the error message on the displaying unit 123 or transmission of the error message to the user terminal.

If a positive determination is made at step S20, the extension/contraction controller 120 proceeds to step S40 and causes the upper unit 10 to extend or contract according to the acquired size of the under unit 20. For example, by controlling the driving device 130 to cause the upper unit 10 which is in a stored state to extend, the extension/contraction controller 120 extends the width or length of the upper unit 10 and causes positions of the connection portions 14 of the upper unit 10 to correspond to positions of the connection portions 26 of the under unit 20.

At step S50, the extension/contraction controller 120 causes the interior parts 13 in a folded state to be unfolded.

At this time, if an unfolded state of the interior parts 13 (for example, a position of the seat, an inclination angle of the seat back or the like) is specified, the extension/contraction controller 120 may unfold the interior parts 13 such that the interior parts 13 are in the specified unfolded state.

Thus, according to the present embodiment, it is possible to, at the time of attaching the upper unit 10 to the under unit 20, automatically adjust the size of the upper unit 10 according to the size of the under unit 20.

Next, FIG. 11 is a flowchart illustrating a process that the extension/contraction controller 120 executes at the time of storing the upper unit 10. When an instruction to store the upper unit 10 is given by operation of the user via the user terminal or the inputting unit 124, the extension/contraction controller 120 executes the process of FIG. 11.

At step S110, the extension/contraction controller 120 determines whether it is possible to contract the upper unit 10 into the storage state. For example, if existence of the user is not detected in the upper unit 10 by the sensor 150, or it is detected that the connection portions 14 are separated from the connection portions 26, the extension/contraction controller 120 determines that it is possible to contract the upper unit 10. Note that the process of step S110 is not essential. When the storage instruction is given from the user, the process of step S120 may be executed without the process of step S110 being performed.

At step S120, the extension/contraction controller 120 folds the interior parts 13 that are foldable. In other words, the extension/contraction controller 120 folds the interior parts 13 so that the interior parts 13 are accommodated in a space in the contracted upper unit 10.

At step S130, the extension/contraction controller 120 causes the upper unit 10 to contract so that the length of the upper unit 10 becomes the minimum value of the adjustment range, by controlling the driving device 130.

As described above, by reducing the size of the upper unit 10 at the time of storing the upper unit 10, a space required for storage can be kept small.

Modification of Second Embodiment

In the second embodiment described above, the upper unit 10 is extended or contracted according to the size of the under unit 20. However, extension/contraction of the upper unit 10 may be restricted according to the size of the under unit 20. FIG. 12 is a flowchart illustrating a modification of the process that the extension/contraction controller executes at the time of attaching the upper unit 10.

Similarly to FIG. 10, the extension/contraction controller 120 which has started the process of FIG. 12, acquires size information at step S10, and determines whether the upper unit 10 can be attached to the under unit 20 at step S20.

If a positive determination is made at step S20, the extension/contraction controller 120 proceeds to step S35 and decides an upper limit height based on the size information about the upper unit 10. In the case of the upper unit 10 that extends or contracts in the height direction as illustrated in FIG. 8, the size in the height direction can be freely changed if the connection portions 14 are connectable to the connection portions 26 on the under unit 20 side. However, when a tall upper unit 10 is loaded on an under unit 20 with a narrow tread width or an under unit 20 with a light vehicle weight, it is assumed to be susceptible to influence of a side wind and the like. Therefore, the extension/contraction controller 120 of the present modification sets the upper limit height of the upper unit 10 based on the size of the under unit 20. Note that the extension/contraction controller 120 may calculate the upper limit by inputting the acquired size to a predetermined function or read out an upper limit value corresponding to the acquired size from a predetermined data table.

At step S40, the extension/contraction controller 120 adjusts the height of the upper unit 10 with the value determined at step S35 as the upper limit, by controlling the driving device 130. For example, if the upper limit value determined at step S35 is beyond the adjustment range of the upper unit 10, the extension/contraction controller 120 may control the driving device 130 so that the height of the upper unit 10 becomes the maximum height. Further, if the upper limit value determined at step S35 is within the adjustment range of the upper unit 10, the extension/contraction controller 120 may control the driving device 130 so that the height of the upper unit 10 becomes equal to or below the upper limit value. Note that, at step S35, the extension/contraction controller 120 may set the upper limit value in consideration of attribute information such as a suspension type and the number of wheels in addition to the size of the under unit 20. Furthermore, the extension/contraction controller 120 may set the upper limit value in consideration of information about a state of a route on which the vehicle 100 is schedule to travel (existence/non-existence of an unpaved road, the largest inclination, whether traveling on a highway is scheduled or not, or the like), weather at the time when the vehicle 100 is scheduled to travel (a possibility that a road freezes, wind speed, rainfall and the like) or the like.

The present disclosure can also be realized by supplying a computer program in which the functions described in the above embodiments are implemented to a computer, and one or more processors that the computer has reading out and executing the program. Such a computer program may be provided to the computer by a non-transitory computer-readable storage medium connectable to a system bus of the computer or may be provided to the computer via a network. The non-transitory computer-readable storage medium is, for example, a disk of an arbitrary type such as a magnetic disk (a Floppy® disk, a hard disk drive (HDD) or the like) and an optical disk (a CD-ROM, a DVD disk, a Blu-ray disk or the like). Further, the non-transitory computer-readable storage medium may be a medium of an arbitrary type that is appropriate for storing electronic commands, like a read-only memory (ROM), a random access memory (RAM), an EPROM, an EEPROM, a magnetic card, a flash memory, an optical card or the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:
1. A vehicle comprising:
an under unit comprising a driving mechanism configured to cause wheels to rotate; and
an upper unit being mounted on the under unit and comprising an extension/contraction mechanism configured to extend or contract the upper unit according to a size of the under unit,
wherein the upper unit comprises:
a driving device configured to cause the extension/contraction mechanism to be driven; and,
a controller configured to acquire a size of the under unit and to control the driving device based on the size, wherein the controller decides a height of the upper unit configured to extend or contract by the extension/contraction mechanism, according to the size of the under unit.

2. The vehicle according to claim 1, wherein the extension/contraction mechanism is a casing, a plurality of members of the extension/contraction mechanism divided in a length direction, a width direction or a height direction being in a nested structure.

3. The vehicle according to claim 1, wherein the upper unit comprises an interior part that is foldable according to extension/contraction of the extension/contraction mechanism.

4. An upper unit mounted on an under unit which is equipped with a driving mechanism configured to rotate wheels of a vehicle, the upper unit comprising:
   an extension/contraction mechanism configured to extend or contract the upper unit according to a size of the under unit;
   a driving device configured to cause the extension/contraction mechanism of the upper unit to be driven; and,
   a controller configured to acquire a size of the under unit and control the driving device based on the size,
   wherein the controller decides a height of the upper unit configured to extend or contract by the extension/contraction mechanism, according to the size of the under unit.

5. The upper unit according to claim 4, wherein the extension/contraction mechanism is a casing, a plurality of members of the extension/contraction mechanism divided in a length direction, a width direction or a height direction being in a nested structure.

6. The upper unit according to claim 4, comprising an interior part that is foldable according to extension/contraction of the extension/contraction mechanism.

7. A non-transitory storage medium stored with a program configured to cause a processor to execute steps of:
   acquiring a size of an under unit equipped with a driving mechanism configured to rotate wheels of a vehicle; and
   controlling an extension/contraction mechanism based on the size of the under unit, the extension/contraction mechanism being configured to cause an upper unit that is to be mounted on the under unit to extend or contract,
   wherein the program is configured to cause the processor to determine whether the upper unit can be attached to the under unit or not based on an extension/contraction range of the upper unit and the size of the upper unit.

8. The non-transitory storage medium according to claim 7, wherein the program is configured to cause the processor to output information about an error when the upper unit cannot be attached to the under unit.

9. The non-transitory storage medium according to claim 7, wherein the program is configured to cause the processor to unfold an interior part provided in the upper unit when causing the upper unit to extend from a stored state to a used state.

10. The non-transitory storage medium according to claim 9, wherein the program is configured to cause the processor to unfold the interior part based on setting information set by a user.

11. The non-transitory storage medium according to claim 7, wherein the program is configured to cause the processor to fold an interior part provided in the upper unit when causing the upper unit to contract from a used state to a stored state.

12. The non-transitory storage medium according to claim 7, wherein the program is configured to cause the processor to decide a height of the upper unit configured to be extended or contracted by the extension/contraction mechanism, according to the size of the under unit.

13. The non-transitory storage medium according to claim 12, wherein the program is configured to cause the processor to decide the height based on attribute information about the vehicle in addition to the size of the under unit.

* * * * *